(12) United States Patent
Lyman

(10) Patent No.: US 11,186,145 B2
(45) Date of Patent: Nov. 30, 2021

(54) CABIN AIR FILTER TRAY

(71) Applicant: DENSO International America, Inc., Southfield, MI (US)

(72) Inventor: Andrew Lyman, Andover, MA (US)

(73) Assignee: DENSO International America, Inc., Southfield, MI (US)

( * ) Notice: Subject to any disclaimer, the term of this patent is extended or adjusted under 35 U.S.C. 154(b) by 258 days.

(21) Appl. No.: 16/426,778

(22) Filed: May 30, 2019

(65) Prior Publication Data

US 2020/0376935 A1 Dec. 3, 2020

(51) Int. Cl.
*B60H 3/06* (2006.01)

(52) U.S. Cl.
CPC ..... *B60H 3/0641* (2013.01); *B60H 2003/065* (2013.01)

(58) Field of Classification Search
CPC ............ B60H 2003/065; B60H 3/0641; B60H 3/0616; B60H 3/0658; B01D 46/0006; B01D 46/0009
See application file for complete search history.

(56) References Cited

U.S. PATENT DOCUMENTS

| | | | |
|---|---|---|---|
| 4,045,139 A * | 8/1977 | Russ | G01N 15/0618 356/36 |
| 5,833,528 A | 11/1998 | Baum et al. | |
| 5,860,856 A * | 1/1999 | Teich | B60H 3/0616 454/158 |
| 10,926,877 B1 * | 2/2021 | Puglisi | B64D 11/0627 |
| 2003/0157881 A1 | 8/2003 | Goupil et al. | |
| 2004/0162018 A1 * | 8/2004 | Lee | F04D 29/601 454/184 |
| 2014/0300262 A1 * | 10/2014 | Flogaus | A47B 88/47 312/319.1 |
| 2016/0076288 A1 * | 3/2016 | Bantle | A47B 88/47 49/417 |
| 2016/0279546 A1 * | 9/2016 | Capuani | B01D 46/521 |
| 2017/0350178 A1 * | 12/2017 | Oshima | E05F 1/16 |

FOREIGN PATENT DOCUMENTS

| | | | | |
|---|---|---|---|---|
| DE | 102007063252 A1 | * | 7/2009 | ........ B01D 46/0006 |
| DE | 102016011451 A1 | | 3/2018 | |
| FR | 2228402 | * | 1/1975 | |
| KR | 19990025260 U | | 7/1999 | |

* cited by examiner

*Primary Examiner* — Steven S Anderson, II
(74) *Attorney, Agent, or Firm* — Harness, Dickey & Pierce, P.L.C.

(57) ABSTRACT

A tray for holding a cabin air filter that filters airflow entering a vehicle passenger cabin. The tray includes a frame configured to hold the cabin air filter. A retention member includes a first end attached to the frame and a second end configured to be anchored at a mounting location in a vehicle. When the frame is moved away from the mounting location, the retention member is tensioned to (i) guide and pull the flexible frame towards the mounting location and/or (ii) hold the flexible frame at the mounting location.

18 Claims, 4 Drawing Sheets

CABIN AIR FILTER TRAY

FIELD

The present disclosure relates to a cabin air filter that filters air flowing to a passenger cabin of a vehicle, and specifically relates to a tray for holding the cabin air filter.

BACKGROUND

This section provides background information related to the present disclosure, which is not necessarily prior art.

Most vehicles include a cabin air filter for filtering airflow entering the passenger cabin from outside the vehicle. The cabin air filter prevents pollutants, such as dust, pollen, smog, and mold spores, from entering the passenger cabin. While existing cabin air filter mounting arrangements are suitable for their intended use, they are subject to improvement.

SUMMARY

This section provides a general summary of the disclosure, and is not a comprehensive disclosure of its full scope or all of its features.

The present disclosure includes a tray for holding an air filter that filters airflow entering a vehicle passenger cabin. The tray includes a frame configured to hold the air filter. A retention member includes a first end attached to the frame and a second end configured to be anchored at a mounting location in a vehicle. When the frame is moved away from the mounting location, the retention member is tensioned to (i) guide and pull the flexible frame towards the mounting location and/or (ii) hold the flexible frame at the mounting location.

The present disclosure further includes a heating, ventilation, and air conditioning (HVAC) system having an evaporator and an air filter. The cabin air filter filters airflow entering a vehicle passenger cabin. A tray includes a frame for holding the cabin air filter. A retention member includes a first end attached to the flexible frame and a second end anchored at a mounting location proximate to the evaporator. When the frame is moved away from the mounting location, the retention member is tensioned to (i) guide and pull the flexible frame towards the mounting location and/or (ii) hold the flexible frame at the mounting location.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Cabin air filters for a vehicle passenger cabin have traditionally been accessible for replacement from within the passenger cabin, such as through the glove box, for example. Recently, original equipment manufacturers have requested that cabin air filters and surrounding portions of the HVAC system be arranged behind the vehicle's dashboard, and outside of the passenger cabin. As a result, the cabin air filter may be arranged in a difficult to access location under the hood of the vehicle.

The present disclosure advantageously provides for a cabin air filter tray 50 (see FIGS. 2-5). The cabin air filter tray 50 makes it easier to access an air filter 90 (see FIG. 3) for servicing or replacement when the air filter 90 is located in a difficult to access location, such as under a vehicle hood 12 (illustrated in a closed position in FIG. 1, and in an open position in FIGS. 2 and 5) in an area with very little overhead space.

Figure 1:
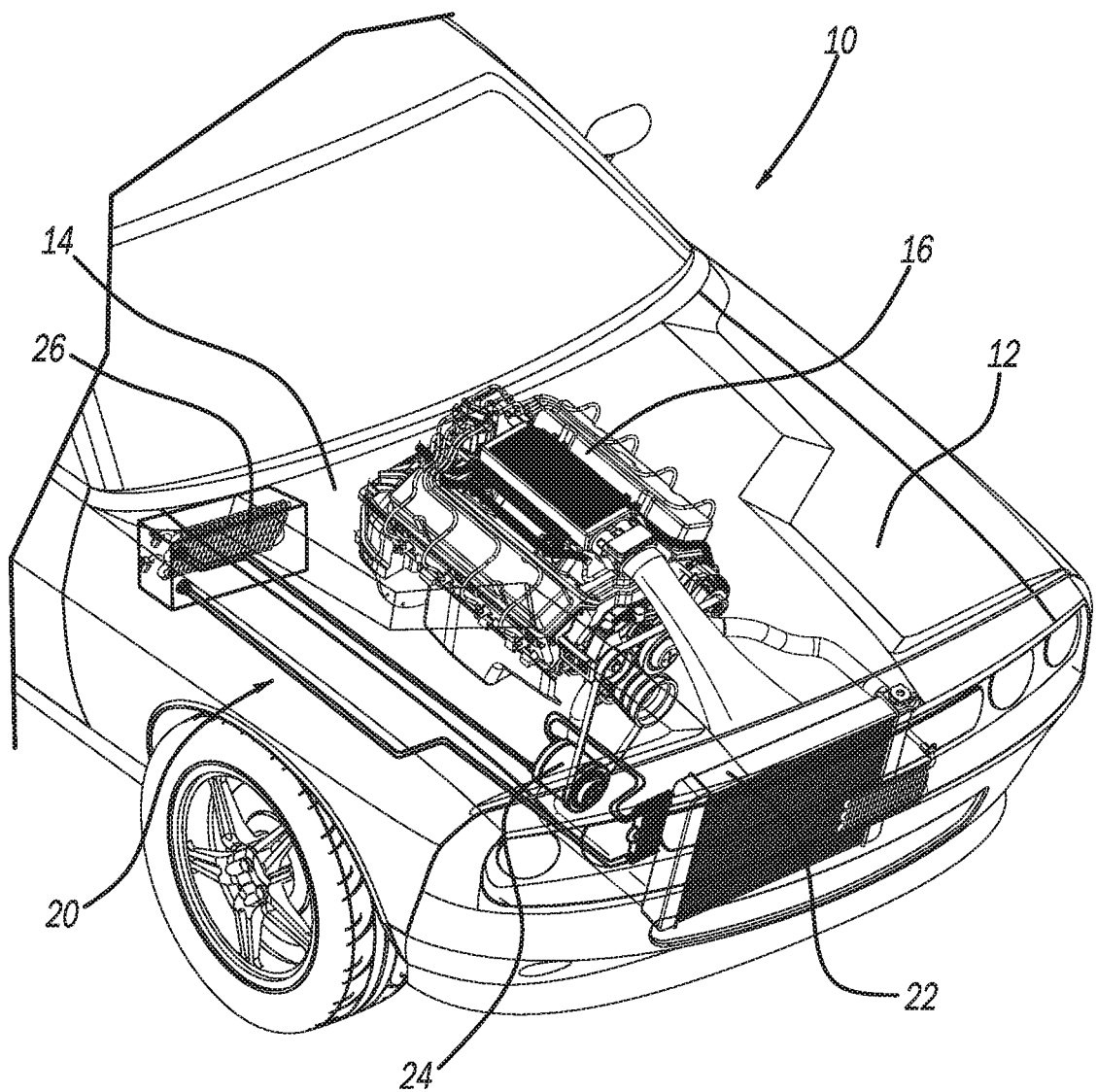
FIG. 1 illustrates a vehicle including a cabin air filter tray in accordance with the present disclosure.

With reference to FIG. 1, an exemplary vehicle 10 is illustrated. Although the vehicle 10 is illustrated as a passenger vehicle, the present disclosure is applicable to any other suitable vehicle as well. Other exemplary vehicles include, but are not limited to, the following: mass transit vehicles, utility vehicles, commercial vehicles, recreational vehicles, construction equipment/vehicles, military vehicles/equipment, aircraft, watercraft, etc.

The vehicle 10 includes the hood 12. With respect to the exemplary vehicle 10 illustrated, beneath the hood 12 is an engine compartment 14 including an engine 16. The engine 16 may be any suitable internal combustion engine. The present disclosure also applies to any suitable hybrid vehicles and fully electric vehicles. Thus, although the vehicle 10 is illustrated and described as including the engine 16, the vehicle 10 may be a fully electric vehicle, hybrid vehicle, etc., which may include any suitable electric powertrain in place of, or in addition to, the engine 16.

Figure 2:
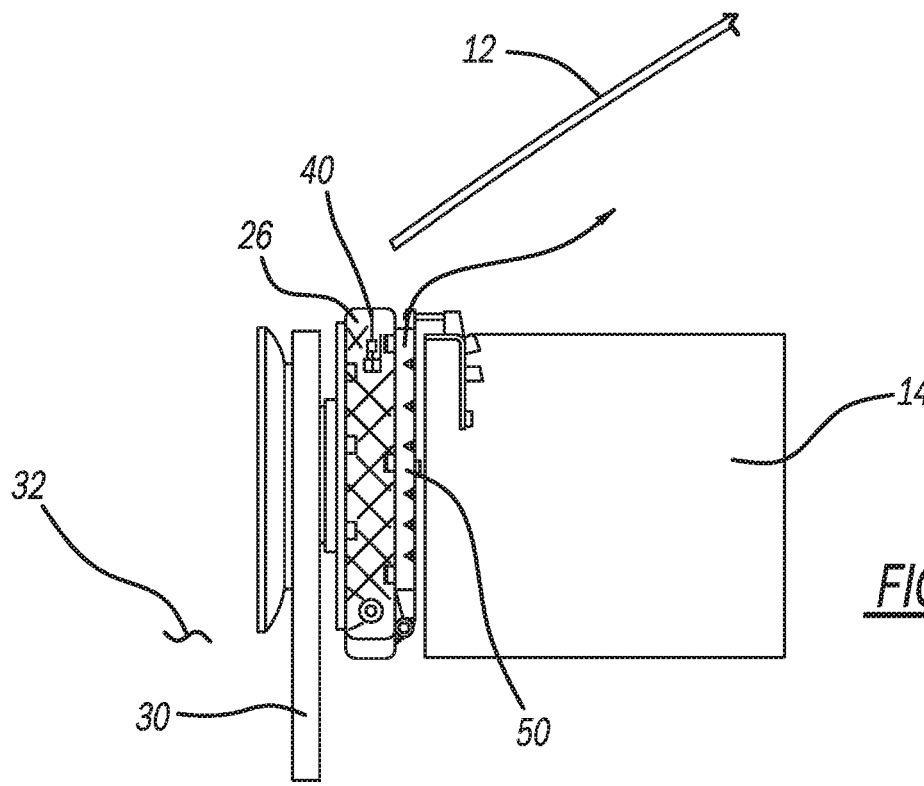
FIG. 2 is a side view of the cabin air filter tray in accordance with the present disclosure arranged under a hood of the vehicle.

The vehicle 10 further includes any suitable heating, ventilation, and air conditioning (HVAC) system 20. In the exemplary HVAC system 20 illustrated, the HVAC system 20 includes a condenser 22, a compressor 24, and an evaporator 26. The condenser 22 is arranged at a front of the vehicle 10, and the evaporator 26 is arranged proximate to a dashboard 30, as illustrated in FIG. 2. The dashboard 30 generally separates the evaporator 26 and the engine compartment 14 from an interior (e.g., passenger cabin) 32 of the vehicle 10. The evaporator 26 is arranged within an evaporator compartment/case 40.

Figure 3:
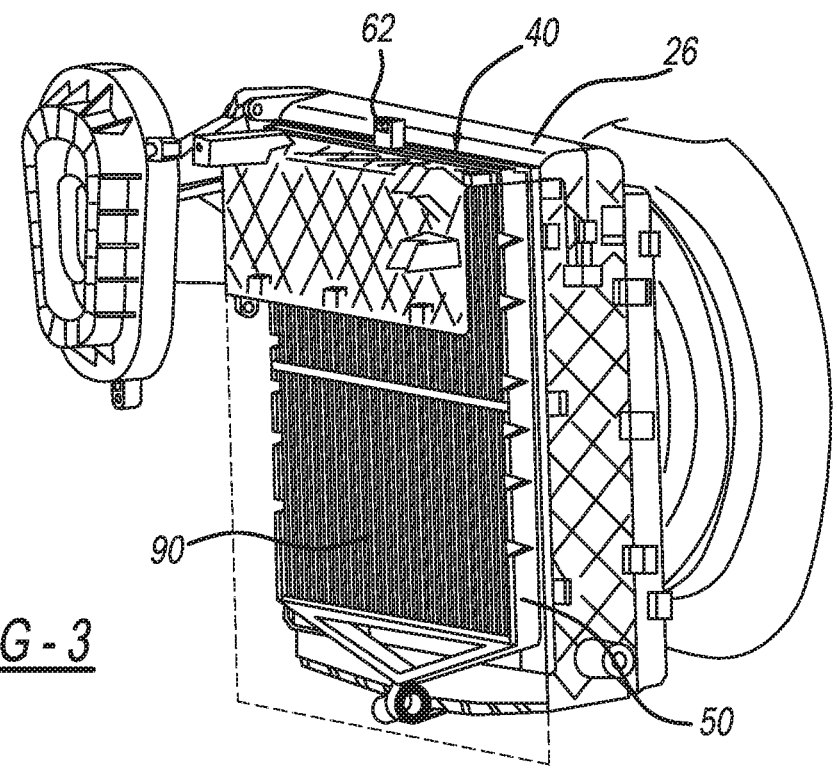
FIG. 3 is a perspective view of the cabin air filter tray and surrounding portions of a heating, ventilation, and air conditioning (HVAC) system of the vehicle.
Figure 4:
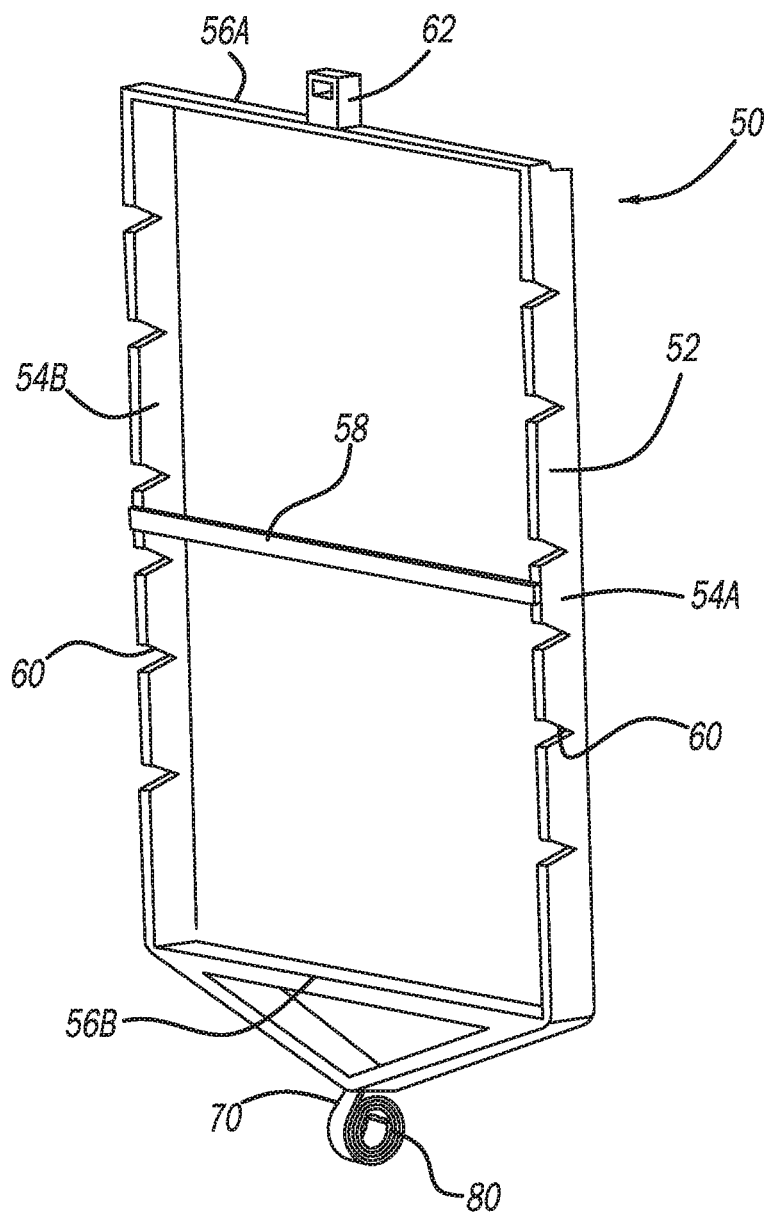
FIG. 4 is an isolated perspective view of the cabin air filter tray.

With continued reference to FIGS. 1 and 2, and additional reference to FIGS. 3 and 4, the HVAC system 20 includes the tray 50 for holding the air filter 90, such as a cabin air filter that filters airflow entering the passenger cabin 32. The air filter 90 can be configured to filter any suitable contaminants or other particles from air entering the passenger cabin 32, such as, but not limited to, dust, pollen, smog, and mold spores.

The tray 50 is seated at any suitable mounting location, such as at a mounting location proximate to the evaporator 26. For example, the mounting location of the tray 50 may be proximate to, or within, the evaporator compartment 40 in order to filter airflow flowing across the evaporator 26. The air filter 90 may be any suitable type of air filter, such as a flexible cabin air filter made of any suitable material, such as paper.

With reference to FIG. 4, the tray 50 includes a frame 52. The frame 52 may be flexible, and thus not rigid. The tray 50, and particularly the frame 52, may be made of any suitable flexible material, such as rubber, plastic, or any other suitable flexible material. The material of the tray 50 can have any suitable flexibility sufficient to allow the frame 52 to be flexed as described herein so that the frame 52 and the air filter 90 seated thereon can be removed from a difficult to access location beneath the hood 12.

The flexible frame 52 includes sidewalls 54A and 54B, which extend generally parallel to each other. At a first end of the sidewalls 54A and 54B is an end wall 56A, which extends perpendicular to the sidewalls 54A and 54B. At a second end of the sidewalls 54A and 54B is another end wall 56B, which extends perpendicular to the sidewalls 54A and 54B. The end walls 56A and 56B extend generally parallel to each other. A crossbar 58 also extends between the sidewalls 54A and 54B, such as at about a midpoint along the lengths of the sidewalls 54A and 54B. The crossbar 58 strengthens the frame 52 without unduly inhibiting flexibility of the frame 52, particularly in a direction towards a front of the vehicle 10.

To facilitate flexion of the frame 52, the sidewalls 54A and 54B define a plurality of cutouts or slats 60. In the example of FIG. 4, the cutouts 60 are generally triangular shaped, and on a side of the sidewalls 54A and 54B opposite to the interior 32 of the vehicle 10 to allow the flexible frame 52 to be flexed away from the interior 32. In other words, the cutouts 60 face toward the front of the vehicle 10, such as toward the engine compartment 14. As explained further herein, this facilitates removal of the tray 50 from within the mounting location (such as at the evaporator compartment 40) so that the air filter 90 may be replaced or serviced.

Figure 5:
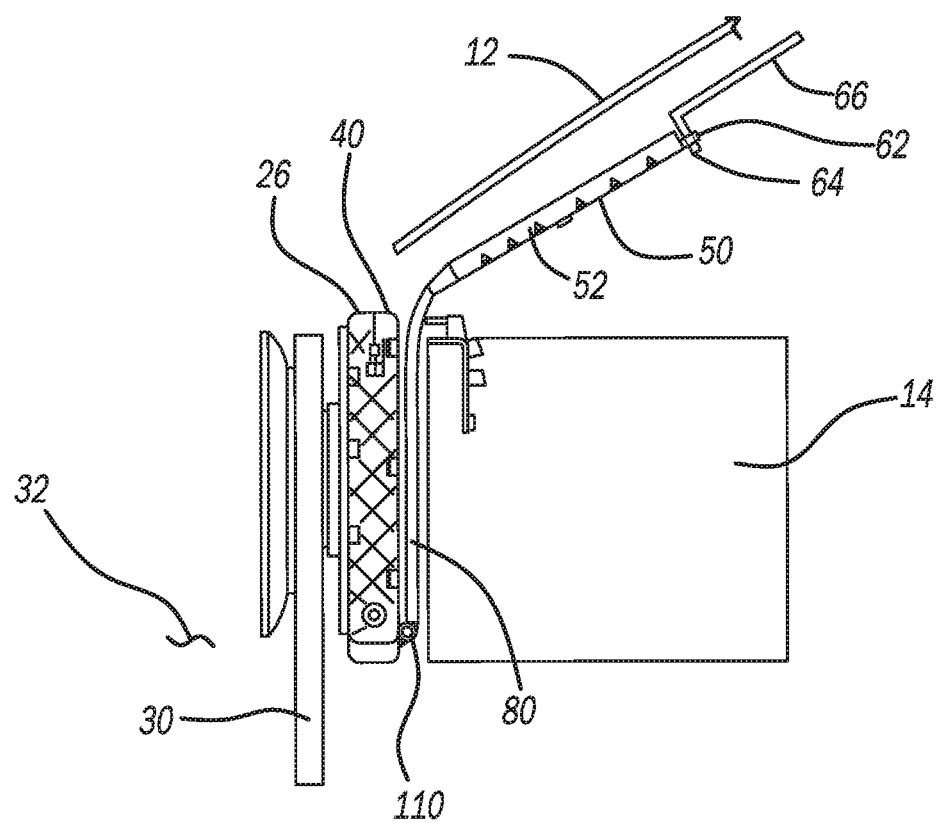
FIG. 5 illustrates the cabin air filter tray pulled out from a mounting location at an evaporator for replacement of a cabin air filter seated within the tray.

The tray 50 further includes an aperture 62, which in the example illustrated is located at the end wall 56A. With reference to FIG. 5, the aperture 62 may have any suitable shape and size for cooperating with a hook 64 at an end of a rod 66. In the example illustrated in FIG. 5, the hook 64 may be hooked onto the aperture 62 to facilitate removal of the tray 50 by pulling on the rod 66 when the tray 50 is seated in an area that is difficult to access.

With reference to FIGS. 4 and 5, the tray 50 further includes a mount 70. Coupled to the mount 70 is any suitable retention member 80, such as a constant force spring. The retention member 80 includes a first end attached to the mount 70, and a second end anchored at a mounting location 110, such as to a bottom of the evaporator case 40 as illustrated at FIG. 5. The retention member 80 is tensioned such that as the tray 50 is pulled out from the mounting location the retention member 80 unwinds and/or expands. After the air filter 90 has been serviced or replaced, the retention member 80 facilitates return of the tray 50 to the mounting location by rewinding and/or retracting to guide and/or pull the tray 50 back to the mounting location, such as back proximate to the evaporator 26.

The present disclosure provides numerous advantages. For example and as illustrated in FIG. 5, the tray 50 and the air filter 90 held thereby are readily accessible even when the tray 50 is arranged in a difficult to access location, such as close to the dashboard 30 on a side of the dashboard 30 opposite to the interior 32 of the vehicle 10 (i.e., located in the engine compartment 14 under the hood 12), and beneath the hood 12 or near hinges of the hood 12, such as beneath an area of the vehicle 10 where front windshield wipers are mounted. Specifically, to access the air filter 90, the tray 50 is grasped either by hand or by way of the rod 66 at the end of the hook 64 hooked onto the aperture 62. Because the frame 52 is flexible, as the tray 50 is pulled upwards (e.g., toward the hood 12) and forward (e.g., toward the front of the vehicle 10), out and away from the mounting location 110, the flexible frame 52 may bend so as to not contact, and clear, the hood 12. As the tray 50 is pulled, the retention member 80 expands (i.e., unwinds). After the air filter 90 has been serviced or replaced, the air filter 90 is returned into cooperation with the flexible frame 52 (or a new air filter 90 is seated in the flexible frame 52) and the tray 50 is pushed and/or guided back into the mounting location proximate to the evaporator 26. As the tray 50 is returned to the mounting location, the retention member 80 contracts (i.e., rewinds), which advantageously guides and/or pulls the tray 50 and the air filter 90 back into the mounting location proximate to the evaporator 26. One skilled in the art will appreciate that the present disclosure provides numerous additional advantages and unexpected results in addition to those set forth above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A tray for holding a cabin air filter that filters airflow entering a vehicle passenger cabin, the tray comprising:
    a frame configured to hold the cabin air filter; and
    a retention member including a first end attached to the frame and a second end configured to be anchored at a mounting location in a vehicle, the retention member is a constant force spring;
    wherein when the frame is moved away from the mounting location, the retention member is tensioned to (i) guide and pull the flexible frame towards the mounting location and/or (ii) hold the flexible frame at the mounting location.

2. The tray of claim 1, wherein the frame is a flexible frame.

3. The tray of claim 2, wherein the flexible frame is made of at least one of rubber and plastic.

4. The tray of claim 3, further comprising a plurality of spaced apart cutouts that allow the frame to be bent without permanent deformation.

5. The tray of claim 2, further comprising the cabin air filter coupled to the flexible frame,
    wherein the cabin air filter is flexible.

6. The tray of claim 2, wherein the tray defines an aperture at an end of the flexible frame that is opposite to the retention member, the aperture is configured to be engaged to pull the flexible frame out from within the mounting location.

7. The tray of claim 6, further comprising a rod with a hook configured to be received within the aperture for pulling the flexible frame out from within the mounting location.

8. The tray of claim 2, wherein the frame is sufficiently flexible to allow the tray to be removed from the mounting location by being pulled upwards towards a hood of the vehicle and forward towards a front of the vehicle to allow removal of the air filter from the frame.

9. A vehicle heating, ventilation, and air conditioning (HVAC) system comprising:
    an evaporator;
    a cabin air filter that filters airflow entering a vehicle passenger cabin;
    a tray including a frame for holding the cabin air filter; and
    a retention member including a first end attached to the flexible frame and a second end anchored at a mounting location proximate to the evaporator, the retention member is a constant force spring;
    wherein when the frame is moved away from the mounting location, the retention member is tensioned to (i) guide and pull the flexible frame towards the mounting location and/or (ii) hold the flexible frame at the mounting location.

10. The vehicle HVAC system of claim 9, wherein the frame of the tray is a flexible frame.

11. The vehicle HVAC system of claim 10, wherein the flexible frame is made of at least one of rubber and plastic.

12. The vehicle HVAC system of claim 11, further comprising a plurality of spaced apart cutouts in the flexible frame that allow the flexible frame to bend without permanent deformation.

13. The vehicle HVAC system of claim 10, wherein the cabin air filter is flexible.

14. The vehicle HVAC system of claim 10, wherein the tray defines an aperture at an end of the flexible frame that is opposite to the retention member, the aperture is configured to be engaged to pull the flexible frame out from within the mounting location.

15. The vehicle HVAC system of claim 14, further comprising a rod with a hook configured to be received within the aperture for pulling the flexible frame out from the mounting location.

16. The vehicle HVAC system of claim 9, wherein the first end of the retention member is attached to a mount of the tray.

17. The vehicle HVAC system of claim 9, wherein the tray and air filter are flexible to allow the tray and the air filter to be removed out from within an evaporator case without contacting a hood of the vehicle arranged over the evaporator case.

18. The vehicle HVAC system of claim 17, wherein the tray and the air filter are removable vertically out from within the evaporator case.

* * * * *